United States Patent
Cunningham et al.

(10) Patent No.: US 10,202,120 B2
(45) Date of Patent: Feb. 12, 2019

(54) METHODS AND SYSTEM FOR DECELERATING A VEHICLE

(71) Applicant: Ford Global Technologies, LLC, Dearborn, MI (US)

(72) Inventors: Ralph Wayne Cunningham, Milan, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 301 days.

(21) Appl. No.: 15/170,014

(22) Filed: Jun. 1, 2016

(65) Prior Publication Data
US 2017/0349179 A1  Dec. 7, 2017

(51) Int. Cl.
| | |
|---|---|
| *B60W 30/18* | (2012.01) |
| *B60W 10/02* | (2006.01) |
| *B60W 10/06* | (2006.01) |
| *B60W 10/10* | (2012.01) |
| *B60W 10/184* | (2012.01) |

(52) U.S. Cl.
CPC .......... *B60W 30/181* (2013.01); *B60W 10/02* (2013.01); *B60W 10/026* (2013.01); *B60W 10/06* (2013.01); *B60W 10/10* (2013.01); *B60W 10/184* (2013.01); *B60W 30/18072* (2013.01); *B60W 2030/1809* (2013.01); *B60W 2520/10* (2013.01); *B60W 2540/10* (2013.01); *B60W 2540/12* (2013.01); *B60W 2550/22* (2013.01); *B60W 2550/30* (2013.01); *B60W 2710/0644* (2013.01); *B60W 2710/0666* (2013.01); *B60W 2710/1005* (2013.01); *B60W 2710/18* (2013.01)

(58) Field of Classification Search
None
See application file for complete search history.

(56) References Cited

U.S. PATENT DOCUMENTS

| | | | |
|---|---|---|---|
| 5,557,977 A * | 9/1996 | Stockton | B60K 17/28 475/47 |
| 7,757,665 B2 | 7/2010 | Tamai et al. | |
| 8,131,430 B2 | 3/2012 | Lecointre et al. | |
| 8,401,768 B2 | 3/2013 | Lewis et al. | |
| 2007/0072737 A1 * | 3/2007 | Dickinson | B60W 10/02 477/176 |

(Continued)

FOREIGN PATENT DOCUMENTS

| | | |
|---|---|---|
| EP | 1160119 A1 | 1/2000 |
| EP | 2055558 A2 | 10/2008 |

OTHER PUBLICATIONS

D'Amato Anthony Mario et al., "Method and System for Vehicle Cruise Control," U.S. Appl. No. 15/049,603, filed Feb. 22, 2016, 55 pages.

*Primary Examiner* — Justin Holmes
(74) *Attorney, Agent, or Firm* — Julia Voutyras; McCoy Russell LLP

(57) ABSTRACT

A method for improving operation of a vehicle that includes an engine, a transmission, and a torque converter clutch is disclosed. In one example, the method assesses whether or not driver braking is expected and adjusts driveline braking accordingly. The method freewheels the driveline to extend vehicle coasting when driver braking is not expected and the method increases or decreases driveline braking based on a closing distance between the vehicle and an object in the vehicle's path.

18 Claims, 4 Drawing Sheets

(56) References Cited

U.S. PATENT DOCUMENTS

| | | | |
|---|---|---|---|
| 2008/0168964 A1* | 7/2008 | Kimura | B60W 30/18136 123/325 |
| 2008/0172161 A1* | 7/2008 | Kondo | F16H 61/143 701/66 |
| 2011/0039657 A1 | 2/2011 | Gibson et al. | |
| 2011/0136622 A1* | 6/2011 | Enoki | B60W 10/02 477/83 |
| 2013/0296100 A1 | 11/2013 | Nefcy et al. | |
| 2017/0166193 A1* | 6/2017 | Cheong | B60W 20/30 |

* cited by examiner

METHODS AND SYSTEM FOR DECELERATING A VEHICLE

FIELD

The present description relates to a system for improving vehicle braking. The method may be particularly useful for vehicles that include an automatic transmission that includes a torque converter.

BACKGROUND AND SUMMARY

A vehicle may decelerate from time to time when a driver releases an accelerator pedal. The vehicle may decelerate at a constant rate (or at least consistently) until the driver requests torque for acceleration or until vehicle speed is zero or within a threshold speed of zero. By decelerating at a constant rate, a driver may have a sense of when the vehicle will reach zero speed and is an expected vehicle response characteristic. However, if the constant rate of deceleration is large, the vehicle may suffer from lack of fuel economy since the vehicle is losing its kinetic energy to powertrain braking losses. Conversely, if the constant rate of deceleration is small, the driver may have a feeling that the vehicle is maintaining it present speed. Therefore, it may be desirable to provide a rate of vehicle acceleration that provides good fuel economy while reducing the perception that the vehicle is not decelerating.

The inventors herein have recognized the above-mentioned disadvantages and have developed a method for operating a vehicle, comprising: decelerating a vehicle via freewheeling a driveline in response to a demand torque less than a threshold, vehicle speed greater than a threshold, and traffic conditions that do not indicate expected driver braking within a predetermined vehicle travel distance.

By freewheeling a driveline during conditions when demand torque is less than a threshold, vehicle speed is greater than a threshold, and traffic conditions that do not indicated expected driver braking within a predetermined vehicle travel distance, a vehicle's coasting distance may be increased to improve vehicle fuel economy. Further, driveline braking may be increased via increasing an air conditioner compressor load on an engine that is rotating but not combusting air and fuel in response to expected driver braking so that a vehicle's kinetic energy may be converted into useful work or stored energy. For example, a transmission may be shifted into neutral when small decelerations are desired to increase the vehicle's coasting range or distance. The transmission may be shifted into gear with the torque converter locked while the engine is unfueled and spinning to provide a higher level of driveline braking for moderate to higher levels of desired deceleration. Activating an air conditioner compressor and increasing alternator load while the transmission is shifted into gear while the torque converter is locked and while the engine is rotating unfueled may provide even greater levels of driveline braking during conditions when high braking levels are desired or expected. In these ways, driveline braking may be adjusted to provide more useful benefit than simply applying a fixed driveline braking amount during conditions of low torque demand.

The present description may provide several advantages. For example, the approach may extend a vehicle's coasting distance during conditions when very little driveline braking is desired. Further, the approach may provide a desired amount of driveline braking power to decelerate a vehicle during conditions where an adjustable amount of driveline braking may be desirable.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
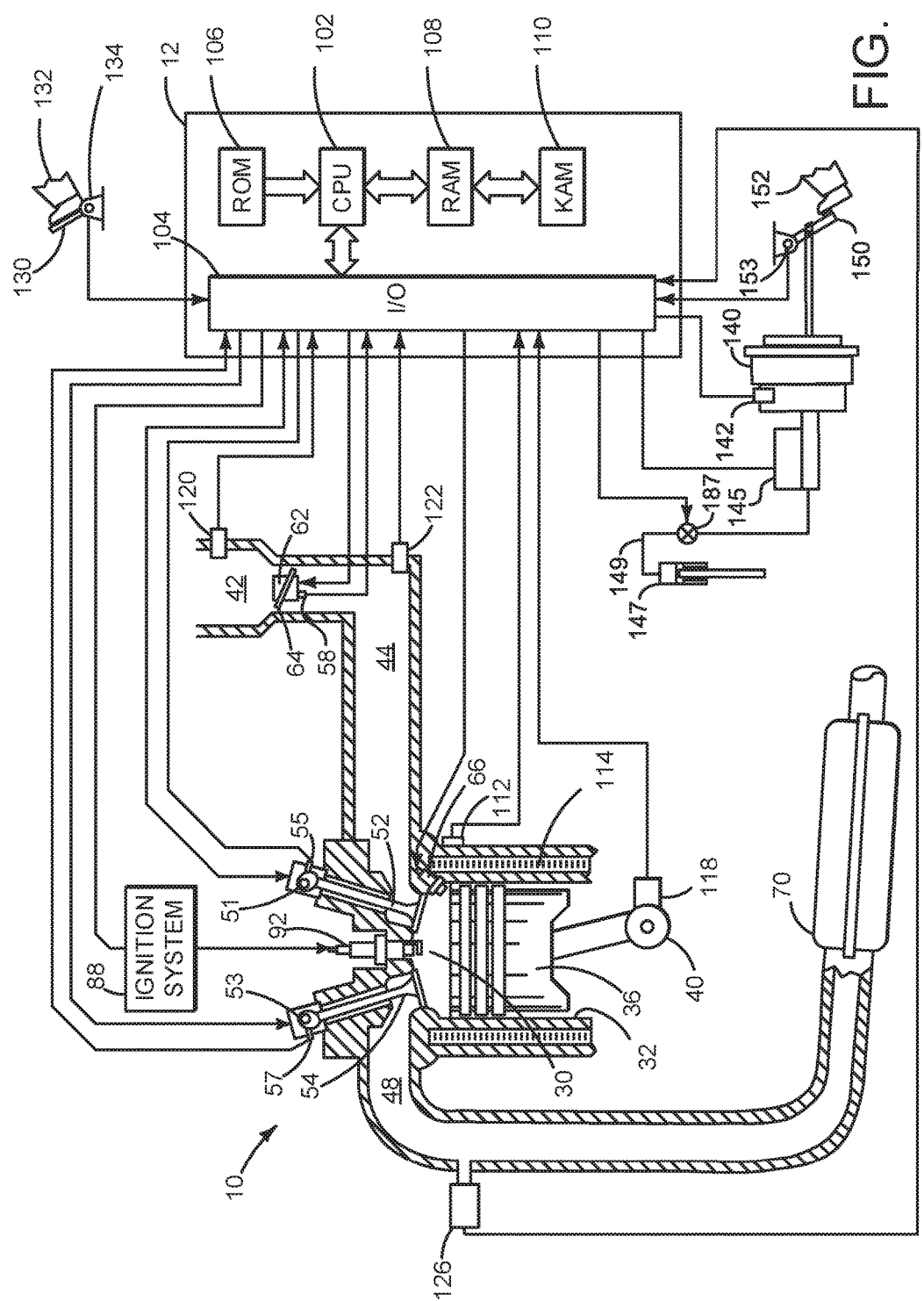
FIG. 1 is a schematic diagram of an engine.
Figure 2:
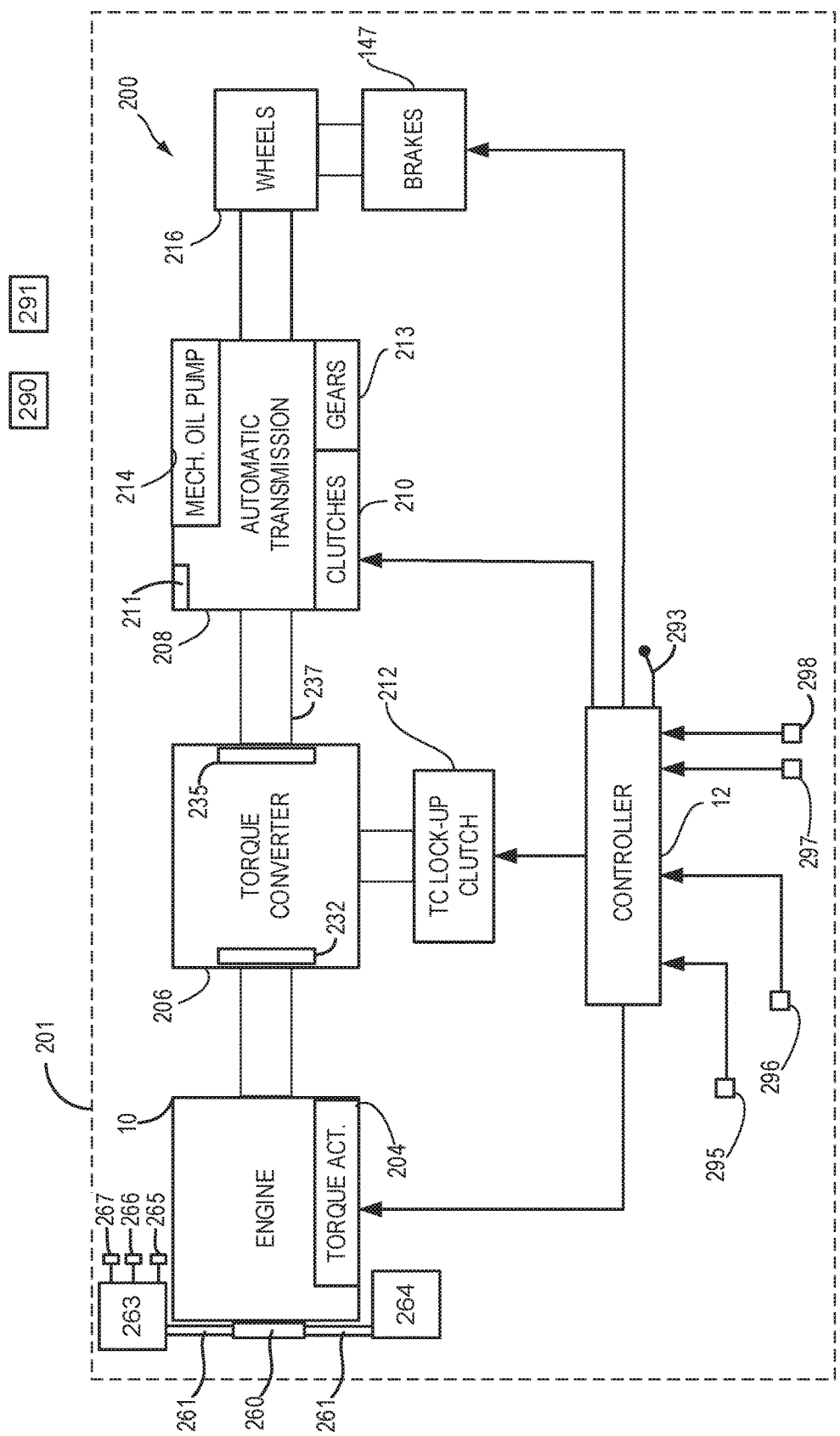
FIG. 2 shows an example vehicle driveline.

The present description is related to controlling operation of a vehicle. In one non-limiting example, the vehicle may include an engine as illustrated in FIG. 1. In addition, the engine may be part of a vehicle that includes a driveline as illustrated in FIG. 2. The vehicle may operate according to the sequence shown in FIG. 3 based on the method of FIG. 4.

The present description describes vehicle control action depending on the rate of deceleration, grade, and other things. For example, if the drive cycle on which fuel economy is measured involves only moderate to high decelerations, shifting a transmission into neutral may not be as effective for fuel economy as deceleration fuel shut off (e.g., rotating the engine without supplying fuel to engine cylinders). For small deceleration rates, shifting the transmission into neutral (with fuel supplied to the engine being on or fuel off) may be better than powertrain braking for fuel efficiency and drivability. Vehicles may be designed to provide a level of deceleration above (e.g., greater than) freewheeling when a driver lifts off the vehicle's accelerator. Consequently, a foot off the accelerator may result in unintended powertrain braking, which without highly efficient brake energy regeneration, produces fuel economy loss. The inventors have realized that look-ahead sensing may be a basis for choosing a proper deceleration mode for the situation. Vehicle look-ahead sensing includes evaluating closing speed, traffic control signals, and grade.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width of signal from controller 12. Fuel is delivered to fuel injector 66 by a fuel system (not shown) including a fuel tank, fuel pump, and fuel rail (not shown). Fuel injector 66 is responds to output from controller 12. In addition, intake manifold 44 is shown communicating with optional electronic throttle 62 which adjusts a position of throttle plate 64 to control air flow from air intake 42 to intake manifold 44.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Vehicle brakes 147 may be supplied pressurized fluid in brake line 149 from master cylinder 145. Brake booster 140 assists operator foot 152 applying brake pedal 150 to operate brakes 147. Vacuum in brake booster 140 may be sensed via vacuum sensor 142. Intake manifold 44 may supply vacuum to vacuum brake booster 140. Brake pedal position sensor 153 provides brake pedal position to controller 12. Valve 187 is operated by controller 12 to selectively allow brake fluid from master cylinder 145 to operate vehicle brakes 147.

Controller 12 is shown in FIG. 1 as a conventional microcomputer including: microprocessor unit 102, input/output ports 104, non-transitory (e.g., read-only memory) 106, random access memory 108, keep alive memory 110, and a conventional data bus. Controller 12 is shown receiving various signals from sensors coupled to engine 10, in addition to those signals previously discussed, including: engine coolant temperature from temperature sensor 112 coupled to cooling sleeve 114; a position sensor 134 coupled to an accelerator pedal 130 for sensing travel or angle applied by foot 132; a measurement of engine manifold pressure from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 shows a vehicle 201 and a block diagram of a vehicle driveline 200. Driveline 200 may be powered by engine 10. Engine 10 may be started with an engine starting system (not shown). Further, engine 10 may generate or adjust torque via torque actuator 204, such as a fuel injector, throttle, camshaft, etc. Engine 10 is the only driveline torque producing device that provides a positive torque to driveline 200.

Alternator 263 may be driven via engine 10 by way of belt 261. Clutch 260 may be selectively engaged to mechanically couple alternator 263 and/or air conditioning compressor 264 to engine 10. Alternatively, clutch 260 may be opened to decouple alternator 263 and air conditioning compressor 264 from engine 10. In one example, air conditioning compressor 264 is a variable displacement compressor that increases output via increasing compressor displacement and vice-versa. Alternator 263 may provide electrical charge to vehicle electrical loads including but not limited to battery 267, windscreen defroster 266, and vehicle lights 265. Mechanical load 364 may also be driven by engine 10 via belt 261. Mechanical load 364 may be a variable displacement air conditioner compressor, air/vacuum pump, or power steering pump. In some examples, vehicle 201 may include an air conditioner compressor, vacuum pump, and power steering pump.

An engine output torque may be transmitted to torque converter 206 to drive an automatic transmission 208. Torque converter 206 includes impeller 232 and turbine 235. Further, one or more gear clutches 210 may be engaged, including forward clutch, to engage gears (e.g., 1-10) and propel vehicle 201. In one example, the torque converter may be referred to as a component of the transmission. Further, gear clutches 213 may be engaged as needed to activate a plurality of fixed transmission gear ratios. The output of the torque converter may in turn be controlled by torque converter lock-up clutch 212. For example, when torque converter lock-up clutch 212 is fully disengaged, torque converter 206 transmits engine torque to automatic transmission 208 via fluid transfer between the torque converter turbine and torque converter impeller, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque relayed to the transmission to be adjusted. A controller may be configured to adjust the amount of torque transmitted by torque converter 212 by adjusting the torque converter lock-up clutch in response to various engine operating conditions, or based on a driver-based engine operation request. Fluid within automatic transmission 208 may be pressurized via mechanical pump 214. In some examples, automatic transmission 208 includes a one-way clutch 211 that allows engine 10 to provide torque to automatic transmission 208 and wheels 216, but it does not allow wheels 216 to supply torque to engine 10.

Torque output from the automatic transmission 208 may in turn be relayed to wheels 216 to propel the vehicle. Specifically, automatic transmission 208 may transfer an input driving torque at the input shaft 237 responsive to a vehicle traveling condition before transmitting an output driving torque to the wheels.

Further, a frictional force may be applied to wheels 216 by engaging wheel brakes 147. In one example, wheel brakes 147 may be engaged in response to the driver pressing his foot on a brake pedal 150 shown in FIG. 1. In the same way, a frictional force may be reduced to wheels 216 by disengaging wheel brakes 147 in response to the driver releasing his foot from a brake pedal.

A mechanical oil pump 214 may be in fluid communication with automatic transmission 208 to provide hydraulic pressure to engage various clutches, such as clutches 210 and/or torque converter lock-up clutch 212. Mechanical oil pump 214 may be operated in accordance with torque converter 212, and may be driven by the rotation of the engine or transmission input shaft, for example. Thus, the hydraulic pressure generated in mechanical oil pump 214 may increase as an engine speed increases, and may decrease as an engine speed decreases. An electric oil pump 220, also in fluid communication with the automatic transmission but operating independent from the driving force of engine 10 or transmission 208, may be provided to supplement the hydraulic pressure of the mechanical oil pump 214.

A controller 12 may be configured to receive inputs from engine 10, as shown in more detail in FIG. 1, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling throttle opening and/or valve timing, valve lift and boost for turbo-or super-charged engines. Controller 12 may determine road grade from inclinometer 295 or from a map. Controller 12 may receive input from a turn signal indicator 293 to let controller 12 know that the driver is intending to turn the vehicle. Further, controller 12 may receive an estimate of road grade from inclinometer 295. Range sensor 296 provides a distance to objects in the path of vehicle 201. Range sensor 296 may be RADAR, light detecting and ranging (LiDAR), sonar, or other known distance ranging device. Global positioning system (GPS) receiver 297 receives satellite positioning data via radio signals transmitted by satellite 290. GPS receiver 297 receives positioning data that may be used to index maps to determine locations of traffic signs or signals, road grade, and other road features such as distance to a route feature such as a road turn. Radio receiver 298 receives radio signals from stationary transmitter 291. Radio receiver 298 may receive locations of traffic accidents and backups.

The system of FIGS. 1 and 2 provides for a system for a vehicle, comprising: a driveline including an engine; an accelerator pedal, a brake pedal; a transmission coupled to the engine, the transmission including a torque converter clutch; and at least one controller including executable instructions stored in non-transitory memory to close the torque converter clutch and freewheel the driveline via shifting a transmission into neutral in response to expected driver applied braking based on traffic conditions, demand torque less than a threshold, and vehicle speed greater than a threshold. The system further comprises additional instructions to increase driveline braking in response to a vehicle brake pedal being applied. The system further comprises additional instructions to increase and decrease driveline braking via increasing and decreasing output of an air conditioner compressor in response to traffic conditions. The system includes where driveline braking is increased in response to a distance between the vehicle and an object in the vehicle's path decreasing. The system includes where driveline braking is decreased in response to a distance between the vehicle and an object in the vehicle's path increasing. The system further comprises additional instructions to cease combustion in the engine and stop the engine in response to the expected driver applied braking based on traffic conditions, demand torque less than a threshold, and vehicle speed greater than a threshold.

Figure 3:
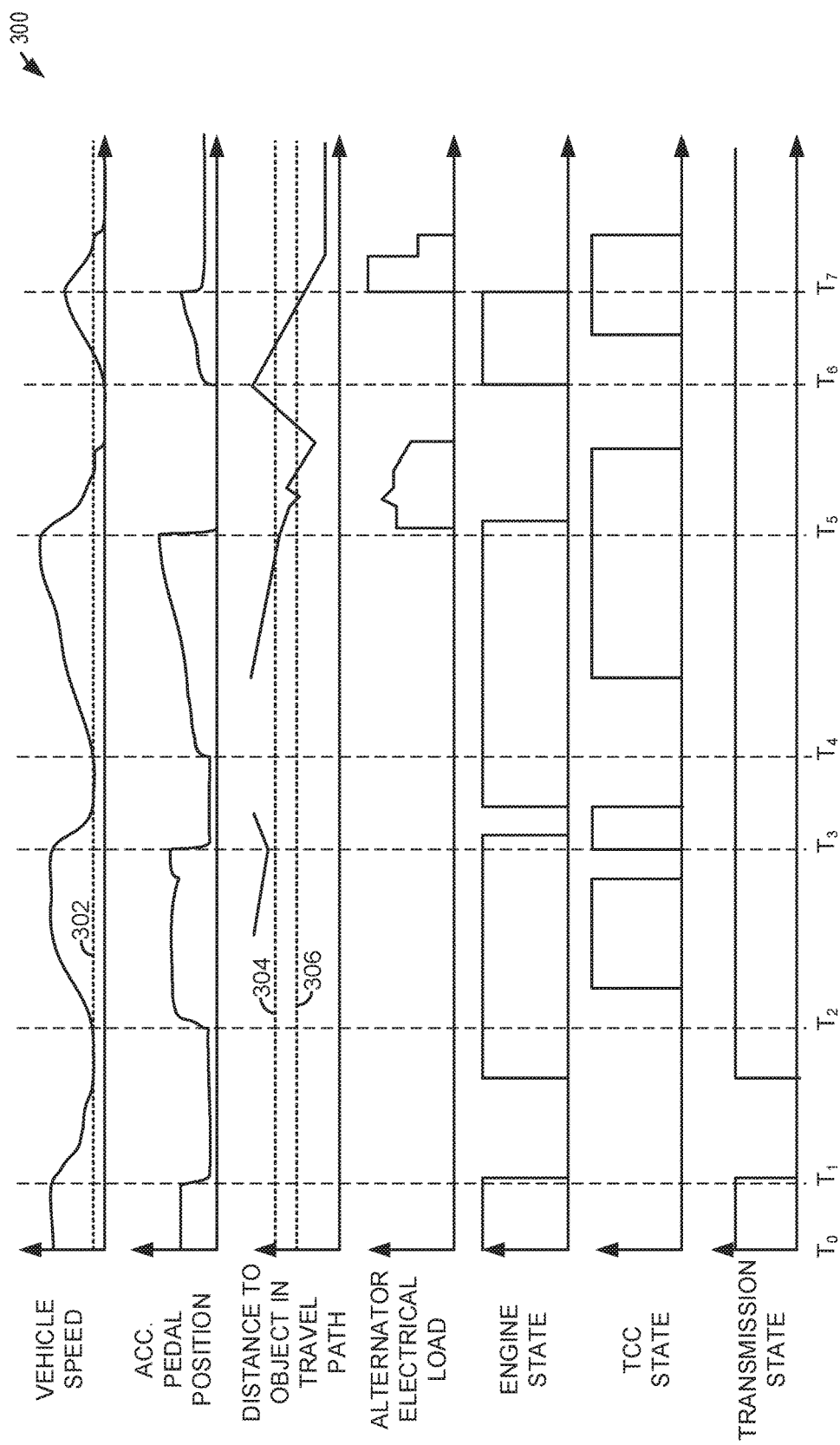
FIG. 3 shows an example operating sequence for a vehicle.
Figure 4:
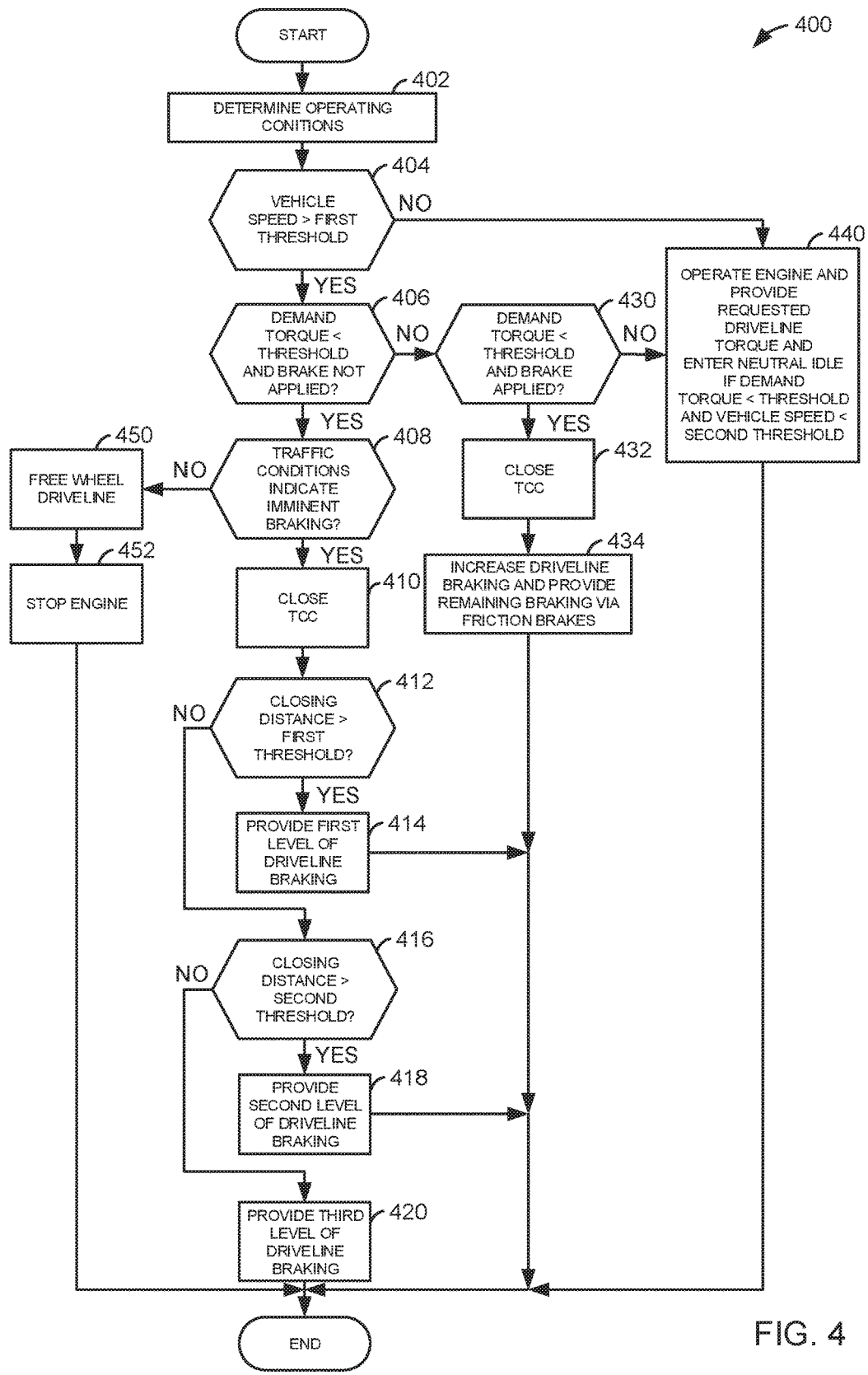
FIG. 4 is a flowchart of an example method for controlling a vehicle during low torque demand conditions.

Referring to FIG. 3, an example plot of a simulated vehicle operating sequence according to the method of FIG. 4 is shown. The plots of FIG. 3 are time aligned and occur at a same timing.

The first plot from the top of FIG. 3 represents vehicle speed versus time. The horizontal axis represents time and time increases from the left hand side of the plot to the right hand side of the plot. The vertical axis represents vehicle speed and vehicle speed increases in the direction of the vertical axis arrow. Horizontal line 302 represents a minimum vehicle speed above which driveline braking may be applied.

The second plot from the top of FIG. 3 represents accelerator pedal position versus time. The horizontal axis represents time and time increases from the left hand side of the plot to the right hand side of the plot. The vertical axis represents the accelerator pedal position and the accelerator pedal is depressed further in the direction of the vertical axis arrow.

The third plot from the top of FIG. 3 represents distance to an object in the vehicle's travel path versus time. The horizontal axis represents time and time increases from the left hand side of the plot to the right hand side of the plot. The vertical axis represents distance to an object in the vehicle's path. The distance to the object in the vehicle's path increases in the direction of the vertical axis arrow. There is no object in the vehicle's path if the trace is missing at a particular time of the sequence. Horizontal line 304 represents a first threshold distance between the vehicle and the object in the vehicle's path. Horizontal line 306 represents a second threshold distance between the vehicle and the object in the vehicle's path. The velocity between the vehicle and an object in the vehicles path is indicated by the slope of the trace representing the distance between the vehicle and the object in the vehicle's path. The distance and the velocity between the vehicle and the object in the vehicle's path may be the basis for providing different levels of driveline braking. For example, the distance and the velocity between the vehicle and the object in the vehicle's path provides situational awareness for adjusting the amount of driveline braking. If the distance between the object the vehicle, and the velocity between the vehicle and the object (e.g., a distance between the vehicle and the object in the vehicle's path at a second time (later time) minus a distance between the vehicle and the object in the vehicle's path at a first time (earlier time) divided by the difference between the second time and the first time) indicates braking is desired, the air conditioning compressor torque and the alternator torque may be added to the driveline. If the distance between the object the vehicle, and the velocity between the vehicle and the object indicates little braking is desired, the vehicles kinetic energy may be used to reduce the distance between the vehicle and the object in the vehicle's path by entering a freewheeling mode. Further, the amount of driveline braking may be increased or decreased in response to road grade by adjusting alternator torque, for example. Operating the vehicle based on the distance between the vehicle and the object in the vehicle's path as well as the velocity between the vehicle and the object in the vehicle's path may improve how the vehicle's kinetic energy is used.

Note that a negative velocity between the vehicle and the object indicates the vehicle is closing on (approaching) the object in its path while a positive velocity indicates the vehicle is separating (moving further away) from the object in its path. A greater magnitude of negative velocity (e.g., −10 kph) indicates that the vehicle is approaching the object at a higher rate of speed than for a smaller magnitude of negative velocity (e.g., −1 kph).

The fourth plot from the top of FIG. 3 represents the electrical load on the vehicle's alternator. Increasing the electrical load on the vehicle's alternator increases a negative torque that the alternator applies to the vehicle's engine and driveline. The vertical axis represents the electrical load on the vehicle's alternator. The horizontal axis represents time and time increases from the left hand side of the plot to the right hand side of the plot.

The fifth plot from the top of FIG. 3 represents engine operating state versus time. The horizontal axis represents time and time increases from the left hand side of the plot to the right hand side of the plot. The vertical axis represents engine operating state. The engine is operating and combusting air and fuel when the trace is at a higher level near the vertical axis arrow. The engine is not combusting air and fuel when the trace is near the horizontal axis.

If the engine is not supplied fuel and it is desired to keep the engine spinning while not fueled, the torque converter is locked to keep the engine spinning. This condition may be referred to as deceleration fuel shut-off (DFSO) or deceleration fuel cut out.

The sixth plot from the top of FIG. 3 represents torque converter clutch (TCC) operating state versus time. The horizontal axis represents time and time increases from the left hand side of the plot to the right hand side of the plot. The vertical axis represents TCC operating state and the TCC is locked when the trace is near the vertical axis arrow. The TCC is open when the trace is near the horizontal axis.

The seventh plot from the top of FIG. 3 represents transmission operating state versus time. The vertical axis represents transmission operating state and the transmission is engaged in a gear so that the driveline does not freewheel when the transmission operating state trace is near the vertical axis arrow. There are two ways to achieve freewheeling. One is with a one-way clutch in the transmission that prevents the engine's friction from retarding the vehicle's forward motion when torque input to the one-way clutch by the engine is less than torque on the wheel side of the one-way clutch. The second way to freewheel is to shift the vehicle's transmission into neutral, thereby decoupling the engine from the driveline downstream of the transmission clutches. The driveline is freewheeling when the transmission operating state is near the horizontal axis. The transmission may freewheel when the transmission is shifted to neutral. Alternatively, the transmission may freewheel if the transmission includes a one-way clutch and the vehicle wheels are providing torque to accelerate the transmission output shaft in a same direction the transmission output shaft is accelerated when the transmission is in a forward gear and when the vehicle's engine applies torque to the transmission input shaft.

At time $T_0$, the vehicle is moving and the accelerator pedal is applied at a middle level. There is no object in the vehicle's travel path and the electrical load applied to the alternator is low. The engine is operating combusting air and fuel and the torque converter is not locked. Further, the transmission is engages so that the driveline is not freewheeling.

At time $T_1$, the driver releases the accelerator pedal until it is almost fully released. The vehicle speed begins to decline in response to the reduction in torque request (e.g., the reduced accelerator pedal position). The velocity between the vehicle and an object in the vehicle's path is low since there is no object in the vehicle's path. Thus, the situational awareness (e.g., distance to an object and velocity between the vehicle and the object) indicates a desire for very little driveline braking so that the vehicle's kinetic energy may be converted into increasing the vehicle's travel distance rather than less efficient use of charging a battery or operating an air conditioner compressor. Therefore, the electrical load applied to the alternator remains low since there is no object in the vehicle's path, no impending route change, and no traffic condition to indicate that the driver is expected to apply vehicle brakes within a predetermined amount of time or within a predetermined distance to a travel route condition. The engine is deactivated shortly after time $T_1$ so that it does not combust air and fuel, thereby conserving fuel in response to the reduction in demand torque. The torque converter is unlocked and the transmission is shifted into neutral so that the driveline freewheels and torque from the vehicle's wheels is not transferred to the engine. Consequently, engine rotation stops. However, if engine stopping (e.g., stopped rotation) is not desirable due to vehicle configuration, the torque converter clutch may be locked and fuel delivery may be ceased to the engine when a situational awareness indicates a lower level of desired vehicle braking. These are the appropriate responses when braking is not commanded or likely to be commanded. This is one example of a first level of driveline braking.

Between time $T_1$ and time $T_2$, the engine is reactivated and the transmission is shifted into a forward gear (e.g., first gear). The engine is reactivated and the transmission is in gear to meet the non-zero demand torque requested by the accelerator pedal.

At time $T_2$, the driver (not shown) increases application of the accelerator pedal in response to driving conditions. The vehicle speed begins to increase in response to the accelerator pedal position. There is no object in the vehicle's path, no impending route change, and no traffic condition to indicate that the driver is expected to apply vehicle brakes within a predetermined amount of time. The electrical load applied to the alternator is low and the engine is operating combusting air and fuel. The torque converter is unlocked and the transmission is in gear.

Between time $T_2$ and time $T_3$, an object enters the vehicle's path while the accelerator pedal is applied. The engine continues to operate combusting air and fuel. The torque converter is locked and then later unlocks near time $T_3$ in response to the accelerator pedal position. The transmission is engage so that the driveline is not freewheeling. If the driver is applying the accelerator greater than a threshold amount, driveline braking is not provided.

At time $T_3$, the driver releases the accelerator pedal until it is almost fully released. The vehicle speed starts declining in response to the reduction in torque request. The electrical load applied to the alternator remains low since the object in the vehicle's path is more than the first threshold distance 304 away and the velocity between the vehicle and the object in the vehicle's path is low. Further, the electrical load remains low since there is no impending route change or traffic condition to indicate that the driver is expected to apply vehicle brakes within a predetermined amount of time or within threshold distance 304 to a travel route condition. The engine is deactivated shortly after time $T_3$ so that it does not combust air and fuel to conserve fuel in response to the reduction in demand torque. The engine provides engine braking torque (e.g., negative torque) to the driveline when the engine stops combusting air and fuel and the engine continues to rotate via the vehicle's kinetic energy and the locked torque converter clutch. The torque converter clutch is locked from an unlocked state and the transmission is engaged in a gear so that the driveline does not freewheel and engine braking torque may counter torque provided from the vehicle's wheels to the driveline. This is one example of a second level of driveline braking, the second level greater than the first level.

Between time $T_3$ and time $T_4$, vehicle speed is reduced via engine braking. The engine is restarted and combustion of air and fuel begins in response to the low vehicle speed and the small amount of torque requested by the accelerator pedal. The distance to the object in the vehicle's path increases as the object accelerates away from the vehicle. The electrical load applied to the alternator is low since the object in the vehicle's path is more than the first threshold distance 304 away, there is no impending route change, and there is no traffic condition to indicate that the driver is expected to apply vehicle brakes within a predetermined amount of time or within threshold distance 304 to a travel route condition. The engine is reactivated and it begins to combust air and fuel in response to vehicle speed being less than threshold 302 when the accelerator pedal is applied. The torque converter clutch is opened in response to vehicle speed being less than threshold 302. The transmission is engaged in a forward gear so that torque is transferred between the engine and vehicle wheels so that the driveline does not freewheel. The object in the vehicle's path leaves the vehicle's path. Instead of waiting for the driver of the auto transmission vehicle to take his foot off the brake, the engine restart (headed to creep mode) begins as the car ahead moves ahead. The engine/transmission benefits from extra lead time to getting into "ready to accelerate mode". This is true of either auto-stop or neutral idle.

At time $T_4$, the accelerator pedal is depressed to increase the demand torque and the vehicle begins to accelerate in response to the accelerator pedal position. The electrical load applied to the alternator remains at a lower level and there is no object in the vehicle's path. The engine is combusting air and fuel and the torque converter clutch is open. The transmission is engaged in a forward gear.

Between time $T_4$ and time $T_5$, an object enters the vehicle's path and the vehicle closes the distance to the object so that the object is within threshold distance 304. The alternator load remains at a lower level and the engine remains combusting air and fuel. The torque converter clutch is locked and the transmission is engaged in a forward gear. The accelerator pedal position increases to accelerate the vehicle.

At time $T_5$, the driver partially releases the accelerator pedal. The vehicle speed is reduced in response to the reduction in torque request. The electrical load applied to the alternator increases in response to the object in the vehicle's path being less than the first threshold distance 304 away and velocity between the vehicle and the object in the vehicle's path being at a higher level. The increased electrical load applied to the alternator increases a negative torque the alternator applies to the engine and driveline. The engine also stops combusting air and fuel while the engine continues to spin so that the driveline braking torque includes both engine braking torque and the negative torque of the alternator. Thus, the driveline braking torque is increased as compared to the driveline braking torque at time $T_3$ in response to the object being in the vehicle's path and being less than distance 304 away from the vehicle and the increased velocity between the vehicle and the object. Consequently, the vehicle may decelerate faster. The torque converter clutch is also locked and the transmission is engaged in a forward gear so that alternator and engine braking torque may oppose torque applied to the driveline via the vehicle wheels. This is one example of a third level of driveline braking, the third level greater than the second level.

Between time $T_5$ and time $T_6$, the distance between the vehicle and the object increases and then decreases. The electrical load applied to the alternator is decreased in response to the increased distance between the vehicle and the object to conserve fuel, but then the electrical load applied to the alternator is increased in response to the decreased distance between the vehicle and the object. The engine is not combusting air and fuel, but it continues to rotate via torque provided by the vehicle's wheels via the vehicle's inertia. The torque converter clutch remains locked until vehicle speed is less than threshold 302. The engine begins combusting air and fuel and the torque converter clutch is unlocked in response to vehicle speed being less than threshold 302.

At time $T_6$, the accelerator is applied by the driver (not shown) and the vehicle begins to accelerate. The distance between the vehicle and the object in the vehicle's path decreases as the vehicle accelerates toward the object. The electrical load applied to the alternator is small and the engine combusts air and fuel to accelerate the vehicle. The torque converter clutch is open to allow torque multiplication through the torque converter. The transmission is engaged in a forward gear.

At time $T_7$, the driver partially releases the accelerator pedal. Shortly thereafter, combustion of air and fuel in the engine ceases while the engine continues to rotate and the electrical load applied to the alternator is increased to a higher level, a level higher than at time $T_5$. The electrical load applied to the alternator is increased to a higher level in response to the vehicle being less than second threshold distance 306 away from the object in the vehicle's path and the negative velocity between the vehicle and the object in the vehicle's path having a greater magnitude. The increased electrical load increases the negative torque that the alternator applies to the driveline and the engine, thereby increasing the vehicle deceleration rate. The torque converter clutch is opened and the engine is restarted combusting air and fuel in response to vehicle speed being less than threshold 302. This is one example of a fourth level of driveline braking, the fourth level greater than the third level.

In this way, driveline braking torque may be adjusted responsive to traffic conditions including objects in a vehicle's path. The variable driveline braking may increase vehicle fuel economy when small amounts of driveline braking are applied when driver braking is not expected. Further, larger amounts of drive line braking may be applied to reduce friction brake wear and provide useful output when driver braking is expected.

Referring now to FIG. 4, a method for operating a vehicle is described. The method of FIG. 4 may be stored as executable instructions in non-transitory memory of controller 12 described in FIGS. 1 and 2. Further, the method of FIG. 4 may provide the operating sequence illustrated in FIG. 3. Further still, at least portions of the method of FIG. 4 may be actions taken in cooperation with a controller in the physical world to transform vehicle operation.

At 402, method 400 determines operating conditions. Operating conditions may include but are not limited to engine speed, engine load, vehicle speed, driver demand torque, accelerator pedal position, brake pedal position, vehicle speed, road grade, distance to objects in the vehicle's path, traffic conditions, changes in vehicle travel route, and engine temperature. Method 400 proceeds to 404.

At 404, method 400 judges if vehicle speed is greater than a first threshold. The first threshold may be less than 10 kph, for example. If method 400 judges that vehicle speed is not less than the first threshold, the answer is no and method 400 proceeds to 440. Otherwise, the answer is yes and method 400 proceeds to 406.

At 440, method 400 operates the engine combusting air and fuel to provide a desired or demand torque. The demand torque may include a driver demand torque as determined from accelerator pedal position, and the demand torque may also include torque to keep the engine at or above idle speed and torque (e.g., creep torque) to move the vehicle at a low speed when the driver is not applying the accelerator pedal. Further, if the demand torque is less than a threshold torque and vehicle speed is greater than a second threshold speed, the vehicle's transmission may be shifted to neutral while the engine idles (e.g., neutral idle). The engine is restarted if it was previously stopped at 452. Method 400 proceeds to exit.

At 406, method 400 judges if demand torque is less than a threshold torque and if the brake pedal is not applied. If so, the answer is yes and method 400 proceeds to 408. Otherwise, the answer is no and method 400 proceeds to 430. In one example, the demand torque may be based on accelerator pedal position and vehicle speed, which index a table of empirically determined demand torque values. The demand torque may be modified by adding in creep torque and idle speed torque values as previously mentioned.

At 430, method 400 judges if demand torque is less than a threshold torque and if the brake pedal is applied by the driver. Alternatively, method 400 may judge if demand torque is less than the threshold torque and if the vehicle brakes are applied via a controller. If so, the answer is yes and method 400 proceeds to 432. Otherwise, the answer is no and method 400 proceeds to 440.

At 432, method 400 closes the torque converter clutch (TCC) if it is open or partially open (e.g., if there is more than a threshold speed difference between torque converter impeller speed and torque converter turbine speed). If the torque converter clutch is already closed, it is held closed. Additionally, if the engine was stopped at 452 and is stopped at 410, closing the TCC may induce engine rotation or the engine may be started (via supplying fuel to the engine) and accelerated to transmission input shaft speed to reduce driveline torque disturbances before the engine is subsequently stopped again at 434. Method 400 proceeds to 434.

At 434, method 400 increases driveline braking and provides remaining braking force via friction brakes in response to vehicle braking being requested via the brake pedal or another source. In one example, a position of a brake pedal is interpreted as an amount of vehicle braking torque to apply to the vehicle. The amount of driveline braking may be increased to a maximum driveline braking amount that is based on battery state of charge, availability of other vehicle electrical loads, and other vehicle conditions. For example, if battery state of charge is low and a wind screen defroster is available, the electrical load applied to the alternator may be increased to the alternator's rated output (e.g., 120 Amperes) so that the alternator applies a maximum negative alternator torque to the engine and the driveline. However, if the battery state of charge limits current flow to the battery, the electrical load applied to the alternator may be less than the alternator's rated output (e.g., 70 Amperes) so that the negative alternator torque applied to the engine and driveline is reduced. The driveline braking may be further increased via engaging an air conditioning compressor clutch or increasing a displacement of an air conditioning compressor. Activating the air conditioner compressor stores pressurized refrigerant in the vehicle's climate control system. Further, engine braking may be provided by ceasing combustion in the engine via ceasing fuel flow to the engine while the engine continues to rotate via torque provided by vehicle wheels. Engine braking torque may be adjusted and increased via adjusting engine valve timing to increase engine pumping losses. The engine braking torque, alternator torque applied to the driveline, and air conditioning compressor torque applied to the driveline may be collectively referred to as driveline braking torque. The driveline braking torque may be subtracted from the braking torque requested by the driver via the brake pedal or via a controller. The remaining torque result from the subtraction may be applied to friction brakes so that the driveline braking torque and wheel torque meets the requested vehicle braking torque (e.g., the torque requested via the driver and a brake pedal or a braking torque requested via a controller). In this way, driveline braking torque and friction brake torque may be adjusted to provide a requested braking torque, the driveling braking torque given priority to supply the requested braking torque to reduce brake wear. Method 400 proceeds to exit.

At 408, method 400 judges if traffic or traffic control conditions indicate that vehicle braking and/or vehicle deceleration is imminent or expected. In one example, method 400 judges if traffic conditions indicate that a driver is expected to apply vehicle brakes or reduce a torque demand to decelerate the vehicle in a predetermined amount of time or within a predetermined travel distance of the vehicle. If vehicle braking or deceleration is expected, it may be inferred that vehicle braking and/or deceleration will be requested via a driver or a controller. Note that vehicle deceleration may occur without vehicle braking.

In one example, a traffic condition that indicates that vehicle braking and/or deceleration is expected in a predetermined amount of time is application of a turn signal indicator. If the turn signal indicator is moved from an idle position to a position to indicate a right or left turn, it may be expected that the driver will apply vehicle brakes or at least partially release an accelerator pedal to begin vehicle deceleration within a predetermined amount of time (e.g., 30 seconds) in order to negotiate the upcoming turn indicated by the turn signal.

In another example, another traffic condition that indicates that vehicle braking or deceleration is expected in a predetermined travel distance is when a vehicle is within a predetermined road intersection based on GPS data and geographical maps stored in controller memory. The geographical maps may indicate that there is a traffic signal or sign at the intersection that requires the vehicle to stop. Thus, when the vehicle is within a predetermined distance of the intersection, traffic conditions may indicate that vehicle braking and/or deceleration is expected within a predetermined distance based on the intersection location and/or traffic signals stored in maps.

In still another example, traffic conditions may indicate vehicle deceleration and/or braking is expected or imminent based on a broadcast location of a traffic accident or construction backup. If the vehicle is within a predetermined distance of the broadcast location, vehicle deceleration and/or braking may be expected or determined to be imminent.

Traffic conditions that may indicate vehicle deceleration or braking is expected may also include a condition where the driver is not applying the accelerator pedal and an object is in the vehicle's path of travel within a predetermined distance. For example, method 400 may judge that traffic conditions indicate imminent vehicle braking when the driver is not applying an accelerator pedal and when an object is within a predetermined distance (e.g., 400 meters) of the vehicle in the vehicle's path of travel. The object in the vehicle's path of travel may be recognized by a vehicle camera, RADAR, LiDAR, or other known type of sensor.

If method 400 judges that vehicle braking or deceleration is expected or will be requested, the answer is yes and method 400 proceeds to 410. Otherwise, the answer is no and method 400 proceeds to 450. Absence of the above conditions may indicate no expected vehicle braking or deceleration.

At 450, method 400 enters the driveline into a freewheeling mode. The driveline may enter freewheeling mode via shifting the transmission into neutral. Alternatively, the driveline may include a one-way clutch in the transmission that allows torque transfer only from the engine to the vehicle wheels, but not from the vehicle wheels to the engine. By entering freewheeling mode, driveline braking and friction losses may be reduced to extend vehicle coasting distance. Method 400 proceeds to 452 after entering freewheeling mode.

At 452, method 400 may stop fuel flow to the engine and stop the engine. By stopping fuel flow to the engine, engine fuel consumption may be reduced. In other examples, the engine may continue to receive fuel and combust the fuel with air while the engine idles. Method 400 proceeds to exit.

At 410, method 400 closes the torque converter clutch (TCC) if it is open or partially open (e.g., if there is more than a threshold speed difference between torque converter impeller speed and torque converter turbine speed). If the torque converter clutch is already closed, it is held closed. Additionally, if the engine was stopped at 452 and is stopped at 410, closing the TCC may induce engine rotation or the engine may be started (via supplying fuel to the engine) and accelerated to transmission input shaft speed before the engine is subsequently stopped again at 414, 418, or 420. Method 400 proceeds to 412.

At 412, method 400 judges if a distance between the vehicle and an object detected in the vehicle's path is greater than a first threshold distance or if a traffic condition that is expected to result in vehicle braking or deceleration is greater than a first threshold distance away from the vehicle. If an object detected in the vehicle's path is greater than a first threshold distance away from the vehicle or a traffic condition that is expected to result in vehicle braking or deceleration is greater than a first threshold distance from the vehicle, the answer is yes and method 400 proceeds to 414. Further, if a traffic condition is expected to occur in a greater amount of time than a first threshold amount of time, the answer is yes and method 400 proceeds to 414. Otherwise, the answer is no and method 400 proceeds to 416.

At 414, method 400 provides a first level (e.g., a lower level) of driveline braking to decelerate the vehicle. In one example, fuel flow is stopped to the engine so that the engine does not combust air and fuel. However, the engine continues to rotate via energy delivered from the vehicle's wheels to the engine. Thus, method 400 supplies engine braking to the driveline to decelerate the vehicle. Alternator loading to the driveline is not increased nor is the air conditioning compressor activated. Additionally, in some examples, the engine braking may be further increased or decreased via adjusting engine valve timing and engine pumping work. In one example, engine braking is increased in response to a magnitude increase in negative velocity between the vehicle and the object or traffic condition in the vehicle's path. For example, if the distance between the vehicle and an object is 100 meters at a first time and 50 meters at a second time with one second between the first time the velocity between the vehicle and the object is (50 meters-100 meters)/1 second, or −50 meters per second, the engine braking may be increased by 5 N-m. However, if the distance between the vehicle and an object is 50 meters at a first time and 100 meters at a second time with one second between the first time the velocity between the vehicle and the object is (100 meters-50 meters)/1 second, or 50 meters per second, the engine braking may be decreased by 5 N-m. In this way, a base amount of driveline braking may be provided and the base amount of driveline braking may be adjusted based on velocity of the vehicles relative to each other. Method 400 proceeds to exit.

At 416, method 400 judges if a distance between the vehicle and an object detected in the vehicle's path is greater than a second threshold distance (e.g., the second distance less than the first distance) or if a traffic condition that is expected to result in vehicle braking or deceleration is greater than a second threshold distance away from the vehicle. If an object detected in the vehicle's path is greater than a second threshold distance away from the vehicle or a traffic condition that is expected to result in vehicle braking or deceleration is greater than a second threshold distance from the vehicle, the answer is yes and method 400 proceeds to 418. Further, if a traffic condition is expected to occur in a greater amount of time than a second threshold amount of time (e.g., the second amount of time less than the first amount of time), the answer is yes and method 400 proceeds to 418. Otherwise, the answer is no and method 400 proceeds to 420.

At 418, method 400 provides a second level (e.g., a middle level) of driveline braking to decelerate the vehicle, the second level greater than the first level. In one example, fuel flow is stopped to the engine so that the engine does not combust air and fuel. However, the engine continues to rotate via energy delivered from the vehicle's wheels to the engine. Thus, method 400 supplies engine braking to the driveline to decelerate the vehicle. Additionally, alternator loading to the driveline is increased or the air conditioning compressor is activated, but not both. Additionally, in some examples, the engine braking may be further increased or decreased via adjusting engine valve timing and engine pumping work. Likewise, the alternator load to the driveline may be increased or decreased via increasing or decreasing the electrical load applied to the alternator. Similarly, the air conditioner compressor load to the driveline may be increased or decreased via adjusting air conditioner displacement. The engine braking, alternator load, and/or air conditioning compressor load may be increased in response to a magnitude increase in negative velocity between the vehicle and the object or traffic condition in the vehicle's path. The engine braking, alternator load, and/or air conditioning compressor load may be decreased in response to a magnitude increase in positive velocity between the vehicle and the object or traffic condition in the vehicle's path. In this way, a second base amount of driveline braking may be provided and the base amount of driveline braking may be adjusted based on velocity of the vehicle relative to the object or traffic condition. Method 400 proceeds to exit.

At 420, method 400 provides a third level (e.g., a higher level) of driveline braking to decelerate the vehicle, the third level greater than the second level. In one example, fuel flow is stopped to the engine so that the engine does not combust air and fuel. However, the engine continues to rotate via energy delivered from the vehicle's wheels to the engine. Thus, method 400 supplies engine braking to the driveline to decelerate the vehicle. Additionally, alternator loading to the driveline is increased and the air conditioning compressor is activated. Additionally, in some examples, the engine braking may be further increased or decreased via adjusting engine valve timing and engine pumping work. Likewise, the alternator load to the driveline may be increased or decreased via increasing or decreasing the electrical load applied to the alternator. Similarly, the air conditioner compressor load to the driveline may be increased or decreased via adjusting air conditioner displacement. Engine braking, alternator load, and air conditioning compressor load may be increased in response to a magnitude increase in negative velocity between the vehicle and the object or traffic condition in the vehicle's path. Engine braking, alternator load, and air conditioning compressor load may be decreased in response to a magnitude increase in positive velocity between the vehicle and the object or traffic condition in the vehicle's path. In this way, a third base amount of driveline braking may be provided and the base amount of driveline braking may be adjusted based on velocity of the vehicle relative to the object or traffic condition. Method 400 proceeds to exit.

The method of FIG. 4 provides for a method for operating a vehicle, comprising: decelerating a vehicle via freewheeling a driveline in response to a demand torque less than a threshold, vehicle speed greater than a threshold, and traffic conditions that do not indicate expected driver braking within a predetermined vehicle travel distance. The method includes where the vehicle driveline is freewheeled via a one way clutch or shifting an automatic transmission of the vehicle into neutral. The method further comprises stopping combustion in an engine of the driveline during freewheeling the driveline and stopping rotation of the engine during freewheeling the driveline. The method includes where the traffic conditions are based on a range finding device. The method includes where the traffic conditions include absence of an asserted turn signal indicator of the vehicle. The method includes where the traffic conditions are based on a traffic signal or sign. The method includes where the traffic conditions are based on a broadcast signal.

The method of FIG. 4 also provides for a method for operating a vehicle, comprising: decelerating a vehicle via freewheeling a driveline in response to a demand torque less than a threshold, vehicle speed greater than a threshold, a vehicle brake pedal not applied, and traffic conditions that do not indicate expected driver braking within a predetermined vehicle travel distance; and decelerating the vehicle via ceasing to supply fuel to an engine of the vehicle while the engine rotates and a torque converter clutch is locked in response to the demand torque less than the threshold, vehicle speed greater than the threshold, the vehicle brake pedal not applied, and traffic conditions that indicate expected driver braking within the predetermined travel distance.

In some examples, the method includes where decelerating the vehicle via ceasing to supply fuel to the engine of the vehicle while the engine rotates and the torque converter clutch is locked is further based on the vehicle being greater than a first threshold distance from an object in the vehicle's travel path. The method further comprises increasing a rate of decelerating the vehicle in response to the vehicle being less than the first threshold distance from the object in the vehicle's travel path, the rate of deceleration of the vehicle increased via increasing an electrical load on an alternator of the vehicle. The method further comprises increasing a rate of decelerating the vehicle in response to the vehicle being less than a second threshold distance from the object in the vehicle's travel path, the rate of deceleration of the vehicle increased via increasing output of an air conditioner compressor. The method further comprises decelerating the vehicle via wheel friction brakes and ceasing to supply fuel to an engine of the vehicle while the engine rotates and a torque converter clutch is locked in response to the demand torque less than the threshold, vehicle speed greater than the threshold, and the vehicle brake pedal applied. The method includes where torque of the wheel friction brakes and torque of the engine sum to a torque requested via a brake pedal. The method includes where the freewheeling includes a transmission shifted into neutral, and where a speed of an engine of the driveline is maintained above an engine idle speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
decelerating the vehicle via freewheeling a driveline in response to a demand torque less than a threshold, vehicle speed greater than a threshold, and traffic conditions that do not indicate expected driver braking within a predetermined vehicle travel distance, where the traffic conditions are based on a range finding device.

2. The method of claim 1, where the vehicle driveline is freewheeled via a one way clutch or shifting an automatic transmission of the vehicle into neutral.

3. The method of claim 1, further comprising stopping combustion in an engine of the driveline during freewheeling the driveline and stopping rotation of the engine during freewheeling the driveline.

4. The method of claim 1, where the traffic conditions include an absence of an asserted turn signal indicator of the vehicle.

5. The method of claim 1, where the traffic conditions are based on a traffic signal or sign.

6. The method of claim 1, where the traffic conditions are based on a broadcast signal.

7. A method for operating a vehicle, comprising:
decelerating a vehicle via freewheeling a driveline in response to a demand torque less than a threshold, vehicle speed greater than a threshold, a vehicle brake pedal not applied, and traffic conditions that do not indicate expected driver braking within a predetermined vehicle travel distance; and
decelerating the vehicle via ceasing to supply fuel to an engine of the vehicle while the engine rotates and a torque converter clutch is locked in response to the demand torque less than the threshold, vehicle speed greater than the threshold, the vehicle brake pedal not applied, and traffic conditions that indicate expected driver braking within the predetermined vehicle travel distance.

8. The method of claim 7, where decelerating the vehicle via ceasing to supply fuel to the engine of the vehicle while the engine rotates and the torque converter clutch is locked is further based on the vehicle being greater than a first threshold distance from an object in a vehicle's travel path.

9. The method of claim 8, further comprising increasing a rate of decelerating the vehicle in response to the vehicle being less than the first threshold distance from the object in the vehicle's travel path, the rate of deceleration of the vehicle increased via increasing an electrical load on an alternator of the vehicle.

10. The method of claim 9, further comprising increasing the rate of decelerating the vehicle in response to the vehicle being less than a second threshold distance from the object in the vehicle's travel path, the rate of deceleration of the vehicle increased via increasing output of an air conditioner compressor.

11. The method of claim 7, further comprising decelerating the vehicle via wheel friction brakes and ceasing to supply fuel to the engine of the vehicle while the engine rotates and the torque converter clutch is locked in response to the demand torque less than the threshold, vehicle speed greater than the threshold, and the vehicle brake pedal applied.

12. The method of claim 11, where torque of the wheel friction brakes and torque of the engine sum to a torque requested via the brake pedal.

13. The method of claim 7, where the freewheeling includes a transmission shifted into neutral, and where a speed of the engine of the driveline is maintained above an engine idle speed.

14. A system for a vehicle, comprising:
a driveline including an engine;
an accelerator pedal
a brake pedal;
a transmission coupled to the engine, the transmission including a torque converter clutch; and
at least one controller including executable instructions stored in non-transitory memory to close the torque converter clutch and freewheel the driveline via shifting the transmission into neutral in response to expected driver applied braking based on traffic conditions, demand torque less than a threshold, and vehicle speed greater than a threshold, and additional instructions to increase driveline braking in response to a vehicle brake pedal being applied.

15. The system of claim 14, further comprising additional instructions to increase and decrease driveline braking via increasing and decreasing output of an air conditioner compressor in response to traffic conditions.

16. The system of claim 14, where driveline braking is increased in response to a distance between the vehicle and an object in a vehicle's path decreasing.

17. The system of claim 14, where driveline braking is decreased in response to a distance between the vehicle and an object in a vehicle's path increasing.

18. The system of claim 14, further comprising additional instructions to cease combustion in the engine and stop the engine in response to the expected driver applied braking based on traffic conditions, demand torque less than the threshold, and vehicle speed greater than the threshold.

* * * * *